Sept. 10, 1968  A. K. DUNLOP ETAL  3,401,112
SEPARATION OF HYDROCARBONS BY CUPROUS SALTS
Filed Feb. 28, 1966
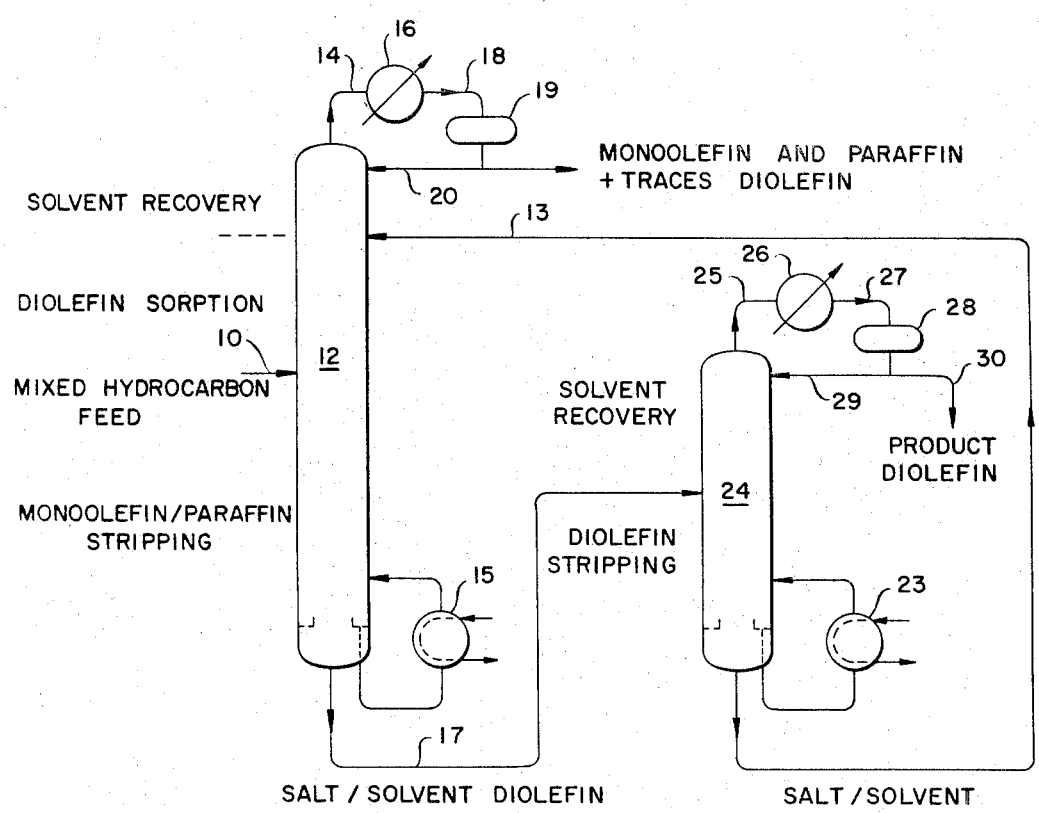
INVENTORS:
A. K. DUNLOP
G. C. BLYTAS
E. R. BELL
BY: John H. Colvin
THEIR ATTORNEY

United States Patent Office 3,401,112
Patented Sept. 10, 1968

---

3,401,112
SEPARATION OF HYDROCARBONS BY CUPROUS SALTS
Arthur K. Dunlop and George C. Blytas, Berkeley, and Edward R. Bell, Walnut Creek, Calif., assignors to Shell Oil Company, New York, N.Y., a corporation of Delaware
Filed Feb. 28, 1966, Ser. No. 530,476
6 Claims. (Cl. 208—308)

---

ABSTRACT OF THE DISCLOSURE

Non-aromatic unsaturated hydrocarbons are separated from more saturated hydrocarbons by selective complex formation with a cuprous salt of the formula CuXA wherein X is oxygen and XA represents the anion of an oxy-acid.

---

This invention relates to a process for the separation of mixtures of hydrocarbons of different degrees of saturation or unsaturation such as the separation and recovery of diolefins from monoolefins and paraffins, of monoolefins from paraffins, of aromatics from paraffins, and for the separation of mixtures of isomeric unsaturated hydrocarbons.

It has long been known that olefins will react with the metal salts of the elements found in Groups I-B, II-B and VIII of the Periodic Table of the Elements (as found in Lange's Handbook of Chemistry, 9th ed., 1956, pages 56–57). Among the most active metal ions to form such complexes are Cu(I), Ag(I), Hg(II), Rh(I), Ni(II), Pd(II), and Pt(II). However, of these materials, the platinum group metals are prohibitively expensive for use in a commercial process; nickel gives complexes only under special conditions; and mercury complexes are highly transitory, since they result in the formation of actual $\sigma$-bonded organo-mercury compounds. With silver and copper, the problem is primarily one of attaining chemical stability without interfering too seriously with the complexing abilities of the respective ions. The silver ion tends to be reduced to metallic silver, whereas the cuprous ion tends to be oxidized to the cupric state or to be disproportionate to the cupric ion and metallic copper. Also, silver salts are much more expensive than the corresponding copper salts.

In considering a cuprous salt-olefin system, however, one must reckon with various competing reactions. They are represented by the following equations, for the reversible reactions, wherein Un represents an olefin, and L a solvent or any other neutral ligand, including water.

$$2Cu^+ \rightleftharpoons Cu^\circ + Cu^{++} \qquad (I)$$
$$Cu^{++} + nL \rightleftharpoons CuL_n^{++} \qquad (II)$$
$$Cu^+ + mL \rightleftharpoons CuL_m^+ \qquad (III)$$
$$CuL_m^+ + Un \rightleftharpoons CuUnL_{m-1}^+ + L \qquad (IV)$$

Equation I represents the familiar disproportionation reaction of cuprous copper, which is displaced to the right in the presence of water because of the greater stability of the aquo-cupric complex (Equation II where L is water) vis-a-vis the aquo-cuprous complex (Equation III). Thus, the cuprous copper concentration in an aqueous medium is severely limited, consequently limiting the formation of the cuprous-olefin complex.

The practice of adding ammonia or chloride ions as complexing agents to maintain the cuprous copper is unsatisfactory for many separations because of their strong abilities to complex with cuprous copper. While some lower olefins and butadiene can compete successfully with these and other strong ligands to form their respective olefin-cuprous complexes, such is not the case with the higher olefins, since the stability of the resulting complex varies inversely with the length or branching of the chain.

An object of the present invention is to provide an improved method for the separation of mixtures of closely-boiling hydrocarbons, particularly for the separation of unsaturated hydrocarbons from a mixture of the same with less unsaturated hydrocarbons, and unsaturated hydrocarbons from a mixture of isomeric unsaturated hydrocarbons.

The invention will be better understood, and other aspects, objects and advantages will become apparent from the following description thereof, which will be made in part with reference to the accompanyng drawing wherein the sole figure is a flow diagram for the recovery of a $C_n$-diolefin from other $C_n$ hydrocarbons by extractive distillation with a solution of cuprous trifluoroacetate in a suitable organic liquid as selective solvent.

It has now been found that the unfavorable reactions set out above can be circumvented by avoiding the presence of any substantial amount of water, by avoiding any substantial amount of other strongly competitive legands for cuprous copper and by using a cuprous salt which provides a suitable concentration of cuprous copper. Further, the use of an inert atmosphere and stable solvents obviates the problem of oxidation by air of the cuprous copper to the cupric state.

In accordance with the present invention, a mixture of closely boiling hydrocarbons of different degrees of saturation or unsaturation, or a mixture of isomers of unsaturated hydrocarbons, is separated by treating the mixture in the substantial absence of water and ammonia, with a fluoro- or oxy-cuprous salt of the general formula CuXA, wherein the moiety XA represents an anion in which X is an oxygen or fluorine atom and A is the remainder of the anion, to form a cuprous copper complex with at least one of the hydrocarbons in the mixture; separating the complex from uncomplexed hydrocarbons; and subsequently decomposing the complex to recover the hydrocarbon therefrom.

In general, the anions of the cuprous salts are anions of inorganic, organic or organo-inorganic acids, the $pK_a$ values of the acids are preferably in the order of 4.6 or less. The anion should be such that the cuprous salt contains at least about 6% by weight copper, i.e., an anion equivalent weight of no more than about 1000, while the anion equivalent weight is preferably no more than about 200. For practical reasons, it is desirable to have a high percentage of copper in the compound, insofar as the advantage is not defeated by reduced solubility in any solvent which it is desired to use. In general, the copper content might be as high as about 60% by weight. Representative suitable anions (XA) are the sulfate and acid sulfate, monoalkyl sulfates, fluoro substituted carboxylates, the nitrate, benzenesulfonate, ethylsulfonate, fluorosulfonate, sulfamates, difluorophosphate and acid phosphates, dialkyl phosphate, diamino phosphate, boroglycerin glycerite (or diglyceroborate), glycol borate, perfluoroborate, hexafluorophosphate, hexafluoroantimonate, and lactate. The anion may be that of a cation exchange resin having an equivalent weight of up to 1000, e.g., a styrene-divinylbenzene copolymer sulfonate anion.

It is often desirable that the cuprous salts or their olefin complexes be appreciably soluble in non-aqueous solvents. Solutions thereof of interest usually contain a minimum of about 5% by weight of the cuprous copper, and preferably over 10% by weight. While a high concentration may be more economical, the solubility of the particular cuprous salt employed in the particular solvent might be a controlling factor.

The solubilities of the cuprous salts and their complexes in various solvents depend on a number of factors. The salt, its complexes, and its solvates, must possess a low crystal energy, so that the energy of solvation released upon dissolution of the salt is sufficient to provide the energy required to separate the solid lattice into molecular or ionic species, or small clusters thereof. In general the melting point of the solvent should be low and its boiling point reasonably high, the solvent thus exhibiting a wide liquid phase range. In this respect, for example, propionitrile with a melting point of −95° C. and a boiling point of +97° C. is an excellent solvent; and in many cases, propionitrile dissolves greater quantities of cuprous salts than acetonitrile, which has a melting point of −45° C. The solubilities of cuprous trifluoroacetate in propionitrile and acetonitrile at 25° C. are 57% and 35% by weight, respectively; and, in this respect, propionitrile is a superior solvent than aqueous mixtures in general. For example, not only in the solubility of $Cu_2SO_4$ in propionitrile twice that obtained in pyridine-water solutions, but the solubility of olefins in the resulting solvents is considerably higher. For example, a saturated $Cu_2SO_4$ propionitrile solution dissolves 20% by weight isoprene, while a saturated $Cu_2SO_4$/pyridine/water solution dissolves only about 10% by weight of the same diolefin.

One cuprous salt particularly suitable for the purposes of this invention is cuprous trifluoroacetate (CuTFA). This novel salt was first prepared by A. K. Dunlop, one of the present inventors, by reacting cuprous oxide with trifluoroacetic acid in the presence of metallic copper and trifluoroacetic anhydride. It can also be prepared by refluxing cupric trifluoroacetate in the presence of metallic copper at about 70° C. in a polar organic solvent, for example, propionitrile, the solvent preferably satisfying the requirements of a solvent that can be used in the subsequent complexation step of this invention.

Cuprous trifluoroacetate gives an ethylene complex a thousand times more stable than that of cuprous chloride, and also gives, for the first time, cuprous complexes with higher acyclic aliphatic olefins, e.g., $C_{10}$ to $C_{20}$ alkenes, as well as with aromatics, dienes and acetylenes. Further, because of its high solubility and stability in various polar solvents, CuTFA lends itself readily to the efficient separation and recovery of the complexed olefins.

In choosing a suitable solvent for use in a process such as an extractive distillation wherein a heating cycle is involved, thermal stability of the system is a major consideration. For example, in the recovery of isoprene from isoamylenes, temperatures much in excess of 120° C. should be avoided. For this reason, in the separation of such reactive diolefins, it is preferred to use a solvent which does not have an exceedingly high boiling point. propionitrile is a satisfactory solvent in this regard. However, many other polar organic solvents lend themselves equally well to the efficient functioning of the system, among these being isobutyronitrile, acetonitrile, the xylenes, propylene carbonate, tetrahydrofuran, ketones and alcohols, teritary butyl toluene, the organo thiocyanates, cyanamides, and sulfides. Mixed solvents such as propionitrile and sulfolane; propionitrile and propylene carbonate; propionitrile and methyl ethyl ketone; propionitrile and isopropyl alcohol; and xylene and propylene carbonate, to name but a few, are useful as solvents for the cuprous salt. However, it is possible to use the cuprous salt alone, with no additional solvent.

The effect of the addition of solvents or other agents to a mixture to be separated under distillation conditions can be shown by an experimental determination of the relative volatilities, in a vapor-liquid system. The relative volatilities can be expressed in terms of alpha values, defined for components A and B as follows:

$$\alpha_{A,B} = \frac{(\text{Mole percent A in vapor})(\text{Mole percent B in liquid})}{(\text{Mole percent B in vapor})(\text{Mole percent A in liquid})}$$

An application of the invention in an extractive distillation is shown in the accompanying drawing. A stream 10 of a mixture of hydrocarbons containing $C_n$ diolefins, monoolefins and paraffins (e.g., isoprene, 2-methylbutene-2 and isopentane) is introduced as a vapor or as a liquid at just below its boiling point into an intermediate zone of a conventional extractive distillation tower 12. A selective solvent mixture, such as a 50:50 by weight solution of CuTFA in propionitrile, enters the tower adjacent its top through line 13, at approximately 30–50° C. Reboiler 15 supplies the heat necessary to the proper operation of the tower, and has as a source of heat, high-pressure supersaturated steam. The tower is maintained at a pressure of 15–35 p.s.i.a. and at top and bottom temperatures of approximately 50–80° C. and 20–50° C., respectively. The feed stream is volatilized, and passes in the vapor state countercurrent to the descending solvent mixture stream which selectively extracts the diolefins and some monoolefin in the sorption zone and which is stripped of the monoolefin in the lower stripping zone to give the solvent extract. This extract is removed from the base of the tower 12 through line 17 and is passed into a solvent stripper 24. The raffinate vapor leaves the top of tower 12 via line 14, and passes through condenser 16 and line 18 into a receiver 19. A portion of the condensate collected in received 19 is returned as reflux through line 20 to the extractive distillation tower.

The solvent stripper 24 operates at a pressure of about 15–25 p.s.i.a., and at a temperature of approximately 80–120° C. Here, the diolefin leaves the solvent in an overhead vapor, and passes via line 25 through condenser 26 and line 27 into receiver 28. The condenser 26 is maintained at a temperature of about 20–45° C. The condensed diolefin is collected in receiver 28 and is recovered as product through line 30. A portion of the condensed diolefin is returned via line 29 as reflux to the stripper. The heat required to volatilize the diolefin is supplied through a reboiler 23 connected to the stripper. The diolefin-free solvent mixture is drown off the bottom of stripper 24 through line 13, and is recycled via line 13 to the eytractive distillation column 12.

The following examples of single-stage separation effects are given for illustrative purposes and are not to be considered as limitations on the invention. All percentages are expressed in percent by weight, and all vapor phase compositions are expressed on a solvent-free basis.

Examples I–XI

A number of runs were made using different hydrocarbon feeds and different solvent mixtures. The hydrocarbon feed stream in each case was equilibrated with the solvent mixture, and the alpha value for each system was determined. The following tabulation sets forth the data for eleven runs:

of the propylene from the vapor phase into the solid CuTFA.

| Run No. | Hydrocarbon feed composition, percent by weight | Solvent mixture composition, percent by weight | Weight ratio, solvent/feed | Vapor phase composition, percent by weight, solvent-free basis | $\alpha$ Value | Temp., °C. |
|---------|------------------------------------------------|------------------------------------------------|----------------------------|---------------------------------------------------------------|----------------|------------|
| I | 2-methylbutene-2, 80; isoprene, 20 | Propionitrile, 45; CuTFA, 55 | 12 | 2-methylbutene-2, 97.8; isoprene, 2.2. | 11 | 23 |
| II | 2-methylbutene-2, 70; isoprene, 30 | Propionitrile, 43; CuTFA, 57 | 8.9 | 2-methylbutene-2, 86.3; isoprene, 13.7. | 2.7 | 80 |
| III | 2-methylbutene-2, 12.5; isoprene, 87.5. | Propionitrile, 63; CuTFA, 37 | 6 | 2-methylbutene-2, 21.3; isoprene, 78.7. | 2 | 52 |
| IV | 2-methylbutene-2, 62; isoprene, 38 | Propionitrile, 84; $Cu_2SO_4$, 16 | 13 | 2-methylbutene-2, 91.84; isoprene, 8.16. | 6.85 | 23 |
| V | 2-methylbutene-2, 64; isoprene, 36 | Propionitrile, 84; CuOAc,[1] 16 | 14 | 2-methylbutene-2, 81.8; isoprene, 18.2. | 2.55 | 24 |
| VI | Propane, 43.25; propylene, 56.75 | THF,[2] 39.5; CuTFA, 60.5 | 7.9 | Propane, 97; propylene, 3 | 42 | 24 |
| VII | Octanes, 85; octenes, 15 | TBT,[3] 74.5; CuTFA, 25.5 | 1.3 | Octanes, 94.4; octenes, 5.6 | 3 | |
| VIII[5] | Mixed octenes,[6] 50; octene-1, 50 | CuTFA, 29; octane,[4] 71 | | Mixed octenes,[6] 92; octene-1, 8 | 12 | 30 |
| IX[5] | Mixed octenes,[6] 50; octene-1, 50 | CuTFA, 29; octane,[4] 71 | | Mixed octenes,[6] 84; octene-1, 16 | 5.2 | 60 |
| X[5] | Mixed dodecenes,[7] 50; dodecene-1, 50. | CuTFA, 26; dodecane,[4] 74 | | Mixed dodecenes,[7] 79; dodecene-1, 21. | 3.8 | 30 |
| XI[5] | 2-methylbutene-2, 50; pentene-1, 50. | Propylene carbonate, 74; CuTFA, 26. | | 2-methylbutene-2, 73; pentene-1, 27. | 2.7 | 30 |

[1] Cuprous acetate.
[2] Tetrahydrofuran.
[3] Tertiarybutyltoluene.
[4] Present as a diluent only.
[5] In the absence of the copper-containing solvent systems in Runs VIII through XI, the $\alpha$-values were about 1.
[6] Octenes other than octene-1.
[7] Dodecenes other than dodecene-1.

Example XII

A hydrocarbon feed containing 62.5 grams of n-pentane and 11 grams of pentene-1 was intimately contacted in liquid-liquid phase with a solvent containing 45.5 grams of CuTFA dissolved in 84.5 grams of propylene carbonate, at about 23° C. After extraction and separation of the polar and non-polar phases, the polar phase contained 5 grams (6.4%) of n-pentane and 10.2 grams (93.6%) of pentene-1. The data value was 145.

Example XIII 260 grams of CuTFA was mixed with 114 grams of octene-1 and 646 grams of octane in a vessel maintained at about 60° C. and at reduced pressure. On distillation, the vapor phase was found to contain 99.12% octanes and 0.88% octene-1. The alpha value for octanes/octene-1 was about 20.

Example XIV

The same procedure used in Example IX was used with 170 grams of dodecene-1 and 960 grams of dodecane in place of the $C_8$ hydrocarbon feed. The vapor phase was found to contain 98.41% dodecanes and 1.59% dodecene-1. The alpha value was about 11.

Example XV

To a mixture of 10 grams dodecene-1 and 20 grams dodecane was added 100 grams of CuTFA. At 30° C., the vapor phase was found to contain greater than 99.9% dodecane and less than 0.1% dodecene-1. The alpha value for dodecane/dodecene-1 was greater than 500.

Example XVI

To a mixture of 5 grams of pentene-1 and 10 grams of pentane was added 100 grams of CuTFA. At 30° C., the vapor phase was found to contain greater than 99.9% pentane and less than 0.1% pentene-1. The alpha value for the pentane/pentene-1 was greatly in excess of 500.

Example XVII

A 150 cc. high-pressure vessel containing 70 grams of solid CuTFA under vacuum was connected through a valve arrangement to a 1-liter vessel containing a 50—50 mixture of propylene and propane under about 150 p.s.i.a. pressure. The valve was opened fully, and the pressure in the two vessels was equalized at about 140 p.s.i.a. Within 15 minutes, the pressure of the entire system had fallen to about 70 p.s.i.a.; there was almost complete absorption

Example XVIII

A hydrocarbon feed composed of 35% isoprene and 65% 2-methylbutene-2 was injected into an extractive distillation column countercurrent to a solvent mixture containing about 45% CuTFA in propionitrile, and the following operating conditions

| | |
|---|---|
| Average column temperature °C | 60 |
| Average condenser temperature °C | 30 |
| Solvent/feed ratio | 8 |
| Average column pressure p.s.i.g | 10 |
| Reflux ratio (internal) | 2.2 |
| Isoprene stripping column reboiler temperature °C | 103–108 |
| Isoprene stripping column operating pressure p.s.i.g | 5–10 |

Isoprene was recovered at a yield of 95% of the original isoprene in the feed and in a purity of 99.5%.

By employing a liquid-liquid extraction (as in Example VII above) in lieu of the extractive distillation technique described above, aromatics can be separated from paraffins. With appropriate solvents such as sulfolane, tetrahydrofuran, ethylene glycol, or furfural, containing a "model" salt, a strong complex can be obtained with the aromatic hydrocarbons. The following example shows that a separation of aromatics can be readily achieved, and that aromatic and aliphatic mixtures previously difficult to separate can now be easily separated by using the process of the present invention.

Example XIX

The separation of benzene, cyclohexene and cyclohexane mixtures was studied using in one case pure propylene carbonate as the liquid phase in a packed (chromosorb) column, and in the other case, using a propylene carbonate/CuTFA mixture as the liquid phase. On the basis of the retention times observed in the two cases, the activity coefficients of the three hydrocarbons were calculated according to the relationship defined at page 177 of A.I.M. Keuleman's Gas Chromatography, New York, Reinhold (1957). The activity coefficients of benzene, cyclohexane and cyclohexene in pure propylene carbonate were found to be 3.5, 12 and 20, respectively, in agreement with measurements made by other investigators. In a mixture of 1 mole of CuTFA in 5 moles of propylene carbonate, they were found to be 5.5, 0.8, and 60, respectively. The ratio of the highest to lowest activity coefficients in the two cases (without and with CuTFA present), which is a measure of the separability of the mixtures, increases from 5.7 to 75, i.e., by a factor of about 13, brought about by the addition of the cuprous salt.

While in a preferred embodiment of the invention, the desired olefin is recovered by a stripping process, any other process that will serve to break up the cuprous salt-olefin complex and liberate the olefin, e.g., ligand exchange, is within the scope of this invention. For example, when complexing an aromatic hydrocarbon, one might use a liquid-liquid extraction coupled with a ligand exchange to obtain a more advantageous yield of the product than is possible in an extractive distillation-stripping process which requires higher temperatures for efficient operation.

It is thus seen that the present invention provides an advantageous method for the selective separation of a diolefin from a monoolefin and/or paraffin, and of a monoolefin from a paraffin, and of an unsaturated hydrocarbon from a mixture containing constituents of the same carbon numbers. Exemplary of the separations which may be effected by the process of the invention are the following: ethylene from ethane; propylene from propane; allene from propylene; the butylenes from the butanes; butadiene from butenes; pentanes from pentenes; pentene-1 from 2-methylbutene-2; isoprene from amylenes; isoprene from piperylenes; pentenes from piperylenes; cyclopentene from cyclopentane; hexenes from hexanes; benzene from cyclohexane and/or hexanes; octenes from octanes; dodecenes from dodecanes; and other olefin-paraffin or isomeric unsaturated hydrocarbon systems in the detergent range. The process is also useful for the separation of two or more olefinic hydrocarbons of different carbon numbers from fluid mixtures thereof with corresponding paraffins.

We claim as our invention:

1. The process of separating mixtures of closely boiling hydrocarbons consisting essentially of at least two hydrocarbons of different degrees of unsaturation by selectively complexing a more highly unsaturated hydrocarbon with cuprous trifluoroacetate under substantially anhydrous conditions and removing the non-complexed hydrocarbon in one phase from the resulting cuprous trifluoroacetate-hydrocarbon complex in a second phase.

2. The process of claim 1 wherein the cuprous trifluoroacetate is provided as a solution in a non-aqueous polar organic solvent.

3. The process of claim 2 wherein the polar organic solvent is propionitrile.

4. The process of claim 2 wherein the polar organic solvent is propylene carbonate.

5. The process of claim 1 wherein the mixture of hydrocarbons to be separated consists essentially of non-aromatic hydrocarbons.

6. The process of claim 1 wherein the mixture of hydrocarbons to be separated consists essentially of monoolefinic and paraffinic hydrocarbons having from 10 to 20 carbon atoms to the molecule.

References Cited

UNITED STATES PATENTS

| | | | |
|---|---|---|---|
| 2,376,239 | 5/1945 | Evans et al. | 260—677 |
| 2,246,257 | 6/1941 | Kohn | 208—324 |
| 2,386,734 | 10/1945 | Wolk | 260—681.5 |
| 2,429,134 | 10/1947 | Morrell et al. | 260—677 |
| 2,855,433 | 10/1958 | Cobb | 260—677 |
| 2,914,584 | 11/1959 | McCaulay et al. | 260—674 |
| 2,953,589 | 9/1960 | McCauley et al. | 260—674 |

DELBERT E. GANTZ, *Primary Examiner.*

HERBERT LEVINE, *Assistant Examiner.*